United States Patent
Sato et al.

(10) Patent No.: US 9,152,033 B2
(45) Date of Patent: Oct. 6, 2015

(54) DISCHARGE LAMP LIGHTING DEVICE AND PROJECTOR

(75) Inventors: Shun Sato, Matsumoto (JP); Yasuaki Morita, Azumiho (JP)

(73) Assignee: SEIKO EPSON CORPORATION, Tokyo (JP)

( * ) Notice: Subject to any disclaimer, the term of this patent is extended or adjusted under 35 U.S.C. 154(b) by 355 days.

(21) Appl. No.: 13/566,424

(22) Filed: Aug. 3, 2012

(65) Prior Publication Data

US 2013/0083300 A1  Apr. 4, 2013

(30) Foreign Application Priority Data

Sep. 30, 2011  (JP) ................................. 2011-217573

(51) Int. Cl.
- G03B 21/20 (2006.01)
- G05F 1/00 (2006.01)
- H05B 37/02 (2006.01)
- H05B 39/04 (2006.01)
- H05B 41/36 (2006.01)
- G03B 35/16 (2006.01)
- H05B 41/392 (2006.01)

(52) U.S. Cl.
CPC .............. *G03B 35/16* (2013.01); *G03B 21/206* (2013.01); *G03B 21/2026* (2013.01); *G03B 21/2053* (2013.01); *H05B 41/3921* (2013.01)

(58) Field of Classification Search
CPC .. G03B 21/20; G03B 21/202; G03B 21/2053; G03B 21/2026; H05B 41/2928

USPC .............. 353/85, 122, 82; 315/291, 307, 295; 352/198; 362/295

See application file for complete search history.

(56) References Cited

U.S. PATENT DOCUMENTS

| | | |
|---|---|---|
| 2005/0151482 A1* | 7/2005 | Riederer et al. ............... 315/291 |
| 2007/0076175 A1 | 4/2007 | Nakagawa et al. |
| 2010/0052538 A1 | 3/2010 | Tanaka et al. |
| 2010/0165305 A1* | 7/2010 | Takezawa ........................ 353/85 |
| 2010/0253920 A1 | 10/2010 | Miyazawa |
| 2012/0026468 A1 | 2/2012 | Terashima et al. |
| 2012/0038755 A1 | 2/2012 | Sato et al. |
| 2012/0044466 A1* | 2/2012 | Sato et al. ........................ 353/85 |

FOREIGN PATENT DOCUMENTS

| | | |
|---|---|---|
| CN | 101662872 A | 3/2010 |
| JP | A-2003-102030 | 4/2003 |

(Continued)

*Primary Examiner* — William C Dowling
*Assistant Examiner* — Ryan Howard
(74) *Attorney, Agent, or Firm* — Oliff PLC

(57) ABSTRACT

A discharge lamp lighting device includes: a discharge lamp drive section which supplies electric power to a discharge lamp; a voltage detecting section which detects drive voltage of the discharge lamp; and a control section which controls the discharge lamp drive section, wherein the control section performs a first control process of controlling the discharge lamp drive section so that the electric power supplied to the discharge lamp is a first power based on the drive voltage detected by the voltage detecting section during a period when the first control process is previously performed, and a second control process of controlling the discharge lamp drive section so that the electric power supplied to the discharge lamp is a second power different from the first power based on the drive voltage detected by the voltage detecting section during a period when the second control process is previously performed.

7 Claims, 9 Drawing Sheets

(56) References Cited

FOREIGN PATENT DOCUMENTS

| JP | A-2008-103091 | 5/2008 |
| JP | A-2009-169304 | 7/2009 |
| JP | A-2009-237302 | 10/2009 |
| JP | A-2010-243543 | 10/2010 |
| JP | A-2012-32504 | 2/2012 |
| JP | A-2012-39497 | 2/2012 |
| JP | A-2012-42707 | 3/2012 |

* cited by examiner

DISCHARGE LAMP LIGHTING DEVICE AND PROJECTOR

BACKGROUND

1. Technical Field

The present invention relates to a discharge lamp lighting device and a projector.

2. Related Art

A projector which uses a discharge lamp such as a high pressure mercury lamp or a metal halide lamp has been put into practical use. As a discharge lamp lighting device used in such a projector, for example, in JP-A-2009-169304, a discharge lamp lighting device is disclosed which is configured to detect a drive voltage of a discharge lamp at least one time while plural colors of color segments are circulated and to drive the discharge lamp while changing lighting power for each color segment.

However, the drive voltage of the discharge lamp is changed in a short time according to electric power for driving the discharge lamp. Thus, in a case where the discharge lamp is driven while the electric power for driving the discharge lamp is changed in a short time, a difference occurs between a target electric current value and an actual electric current value, and thus, it is difficult to control the brightness of the discharge lamp with high accuracy.

SUMMARY

An advantage of some aspects of the invention is to provide a discharge lamp lighting device and a projector which are capable of controlling the brightness of a discharge lamp with high accuracy.

An aspect of the invention is directed to a discharge lamp lighting device including: a discharge lamp drive section which supplies electric power to a discharge lamp; a voltage detecting section which detects a drive voltage of the discharge lamp; and a control section which controls the discharge lamp drive section, wherein the control section performs a first control process of controlling the discharge lamp drive section so that the electric power supplied to the discharge lamp is a first power, and a second control process of controlling the discharge lamp drive section so that the electric power supplied to the discharge lamp is a second power different from the first power, wherein in the first control process, the control section controls the discharge lamp drive section based on the drive voltage of the discharge lamp detected by the voltage detecting section during a period when the first control process is previously performed, and wherein in the second control process, the control section controls the discharge lamp drive section based on the drive voltage of the discharge lamp detected by the voltage detecting section during a period when the second control process is previously performed.

According to this aspect of the invention, as the first control process is performed on the basis of the drive voltage of the discharge lamp detected by the voltage detecting section during the period when the first control process is previously performed, and the second control process is performed on the basis of the drive voltage of the discharge lamp detected by the voltage detecting section during the period when the second control process is previously performed, it is possible to control the electric power supplied to the discharge lamp with high accuracy. Accordingly, it is possible to realize a discharge lamp lighting device capable of controlling the brightness of the discharge lamp with high accuracy.

In this discharge lamp lighting device, the control section may obtain the drive voltage of the discharge lamp detected by the voltage detecting section in each period when the first control process is performed, and may obtain the drive voltage of the discharge lamp detected by the voltage detecting section in each period when the second control process is performed.

Accordingly, it is possible to obtain the drive voltage of the discharge lamp whenever a target electric current value is changed, and to control the brightness of the discharge lamp with high accuracy in accordance with the state of the discharge lamp.

In this discharge lamp lighting device, the control section may obtain the drive voltage of the discharge lamp detected by the voltage detecting section in a second half of a period when the first control process is performed, and may obtain the drive voltage of the discharge lamp detected by the voltage detecting section in a second half of a period when the second control process is performed.

Accordingly, it is possible to obtain the drive voltage of the discharge lamp detected at a timing when the drive voltage of the discharge lamp is stable, and to control the brightness of the discharge lamp with high accuracy.

Another aspect of the invention is directed to a projector including any one of the discharge lamp lighting devices as described above.

According to this aspect of the invention, as the projector includes the discharge lamp lighting device capable of controlling the brightness of the discharge lamp with high accuracy, it is possible to realize a projector which is capable of controlling the brightness of the discharge lamp with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings. The embodiments described below do not unsuitably limit the content of the invention disclosed in the appended claims. Further, all configurations described below are not limited as essential components of the invention.

1. Projector According to the Present Embodiment

Figure 1:
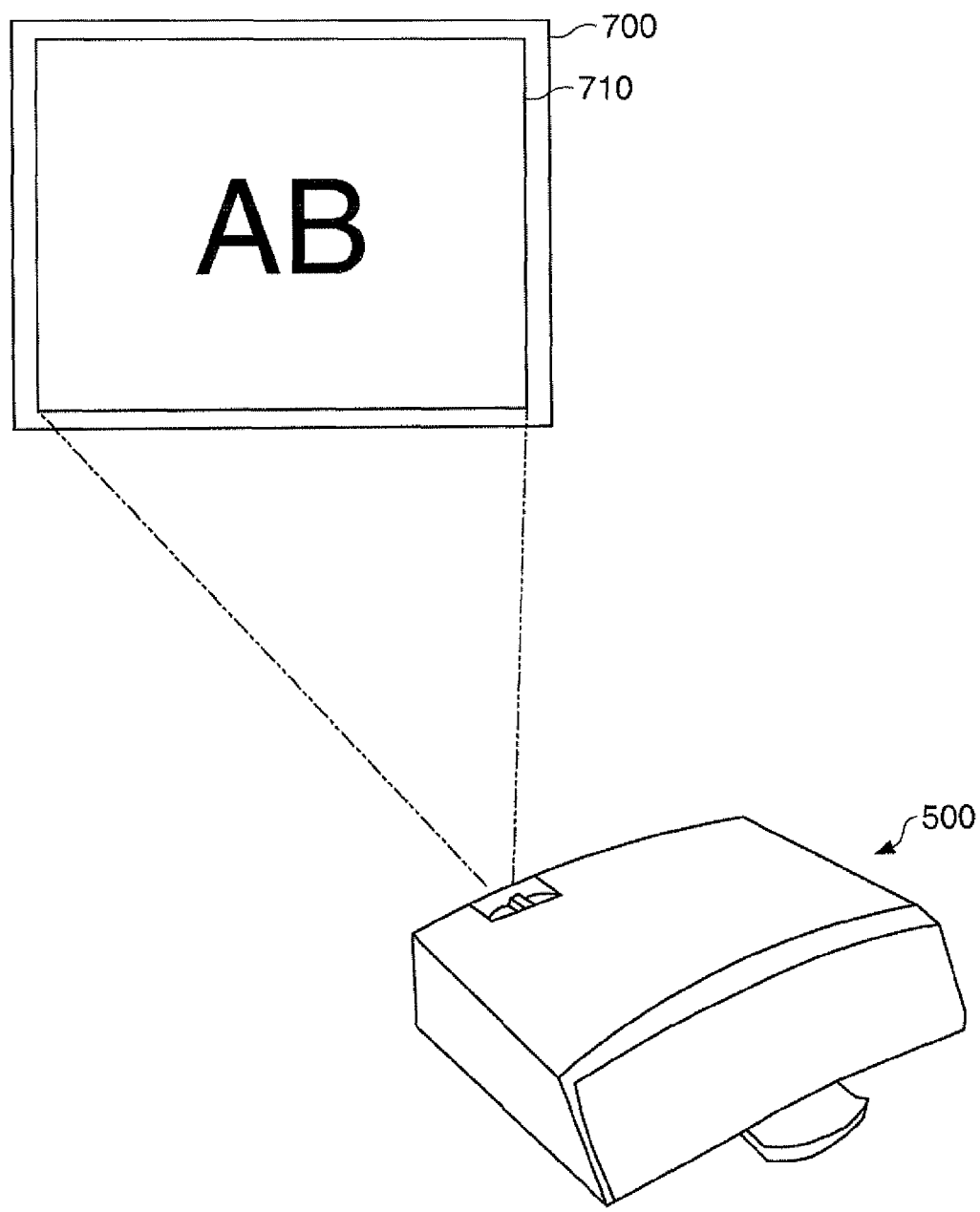
FIG. 1 is a perspective view illustrating a projector according to an embodiment of the invention.

FIG. 1 is a perspective view illustrating a projector 500 according to an embodiment of the invention. In an example shown in FIG. 1, the projector 500 projects an image 710 onto a screen 700.

1-1. Optical System of Projector According to the Present Embodiment

Figure 2:
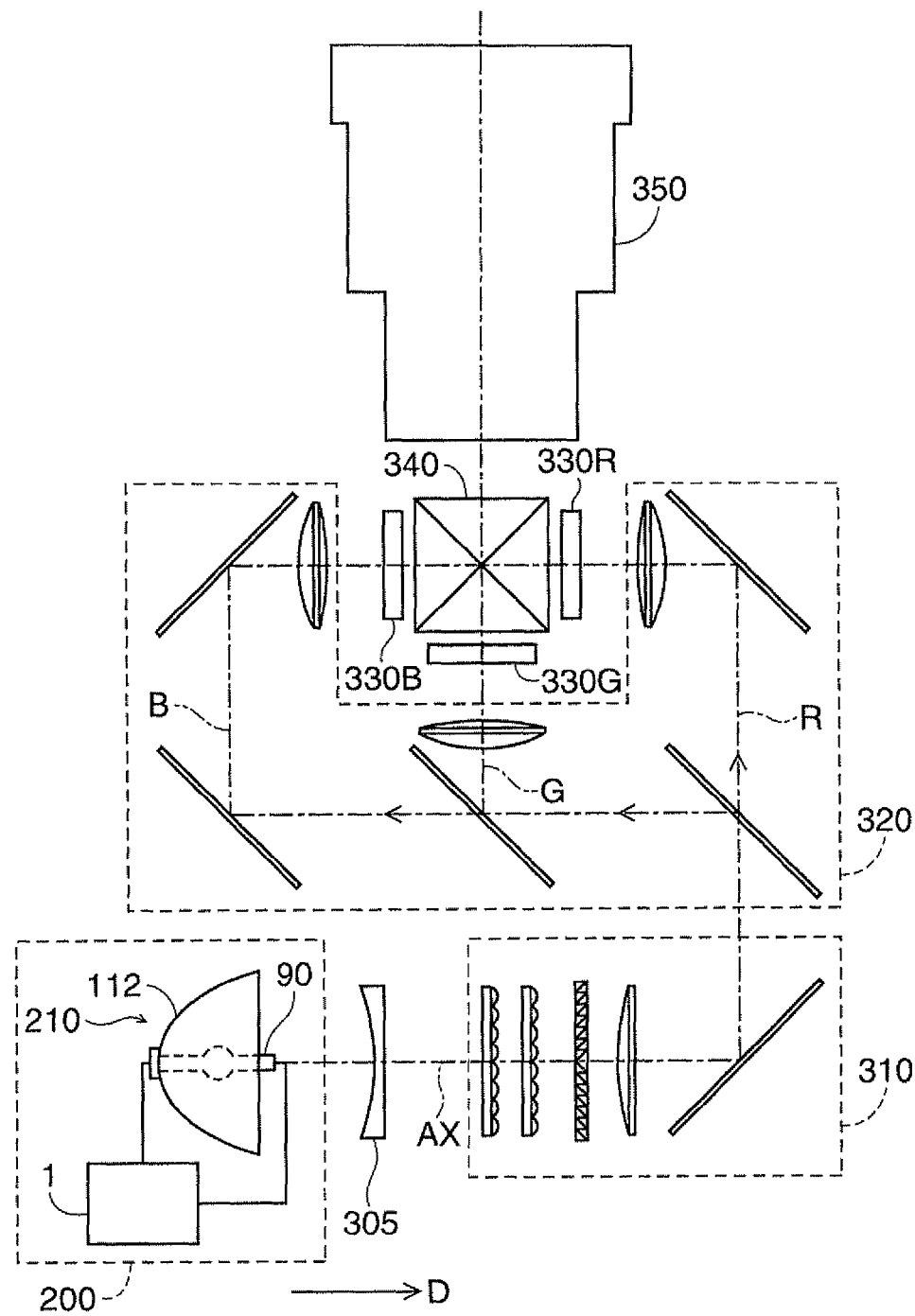
FIG. 2 is a diagram illustrating an optical system of the projector according to the present embodiment.

FIG. 2 is a diagram illustrating an optical system of the projector 500 according to the present embodiment. The projector 500 includes a light source device 200, a collimating lens 305, an illumination optical system 310, a color separation optical system 320, three liquid crystal light valves 330R, 330G and 330B, a cross dichroic prism 340, and a projection optical system 350.

The light source device 200 includes a discharge lamp lighting device 1 and a light source unit 210. The light source unit 210 includes a main reflection mirror 112, a sub reflection mirror 50 (which will be described later in detail), and a discharge lamp 90. The discharge lamp lighting device 1 supplies electric power to the discharge lamp 90 to light the discharge lamp 90. The main reflection mirror 112 reflects light emitted from the discharge lamp 90 in an irradiation direction D. The irradiation direction D is parallel to an optical axis AX. The light from the light source unit 210 passes through the collimating lens 305 and is incident on the illumination optical system 310. The collimating lens 305 collimates the light from the light source unit 210.

The illumination optical system 310 uniformizes the illuminance of the light from the light source device 200 in the liquid crystal light valves 330R, 330G and 330B. Further, the illumination optical system 310 aligns a polarization direction of the light from the light source device 200 into a single direction. This is performed to effectively use the light from the light source device 200 in the liquid crystal light valves 330R, 330G and 330B. The light in which the illuminance distribution and the polarization direction are adjusted is incident on the color separation optical system 320. The color separation optical system 320 separates the incident light into lights of three colors of red (R), green (G) and B (blue). The lights of three colors are respectively modulated by the liquid crystal light valves 330R, 330G and 330B which correspond to respective colors. The liquid crystal light valves 330R, 330G and 330B include liquid crystal panels 560R, 560G and 560B, and a polarization plate which is disposed on a light incident side and a light exiting side of each of liquid crystal panels 560R, 560G and 560B. The modulated lights of three colors are synthesized by the cross dichroic prism 340. The synthesized light is incident on the projection optical system 350. The projection optical system 350 projects the incident light onto the screen 700. Thus, the image 710 is displayed on the screen 700.

As a configuration of each of the collimating lens 305, the illumination optical system 310, the color separation optical system 320, the cross dichroic prism 340 and the projection optical system 350, various known configurations may be employed.

Figure 3:
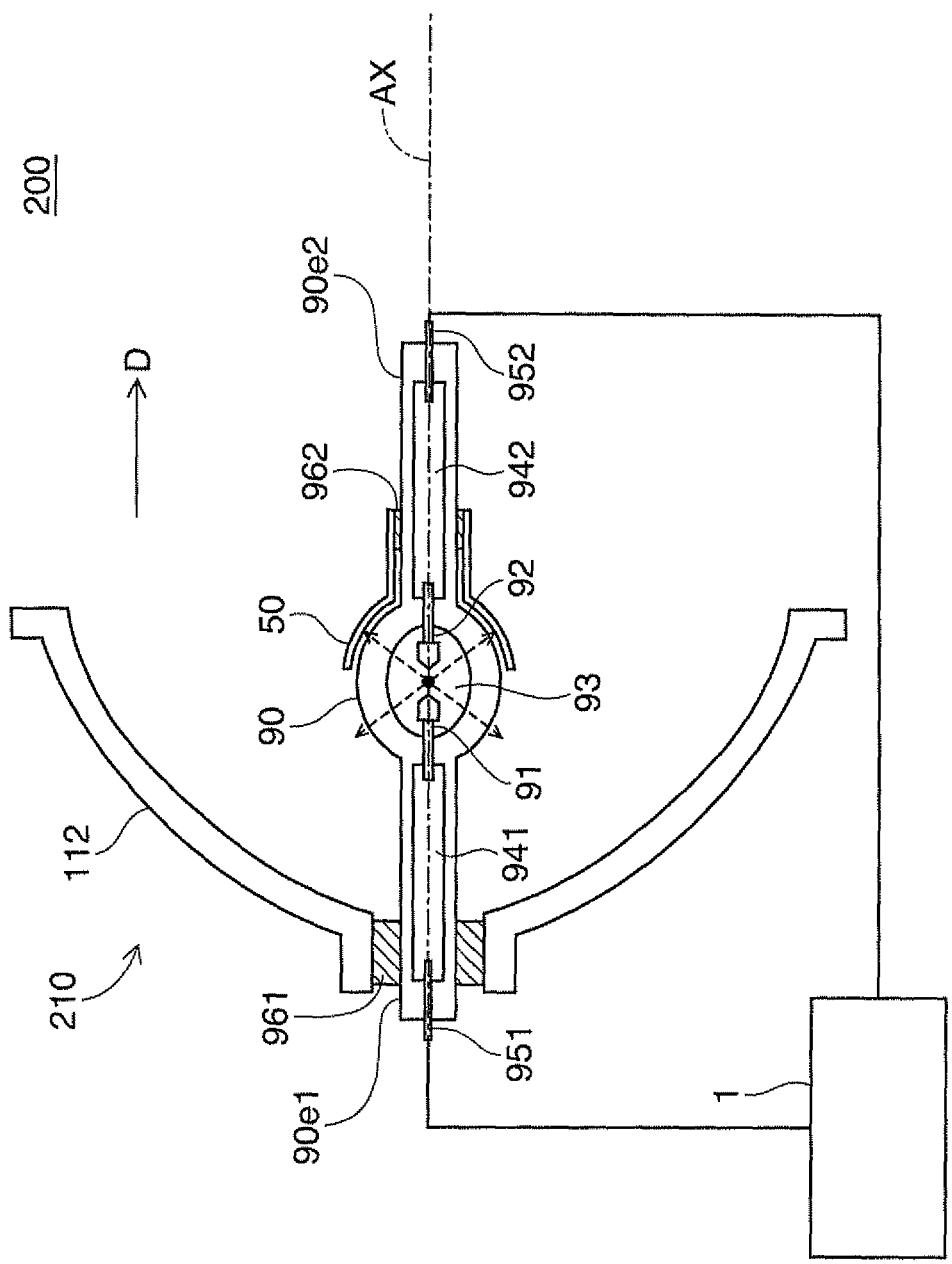
FIG. 3 is a diagram illustrating a configuration of a light source device.

FIG. 3 is a diagram illustrating a configuration of the light source device 200. The light source device 200 includes the light source unit 210 and the discharge lamp lighting device 1. In the figure, a cross-sectional view of the light source unit 210 is shown. The light source unit 210 includes the main reflection mirror 112, the sub reflection mirror 50 and the discharge lamp 90.

The shape of the discharge lamp 90 is a rod shape which extends along the irradiation direction D from a first end part 90e1 thereof to a second end part 90e2 thereof. The material of the discharge lamp 90 is a light transmissive material such as quartz glass. The central part of the discharge lamp 90 expands in a spherical shape, and a discharge space 93 is formed therein. In the discharge space 93, gas which is a discharge medium which includes a rare gas, a metal halogen compound and the like is sealed.

Further, a first electrode 91 and a second electrode 92 protrude from the discharge lamp 90 in the discharge space 93. The first electrode 91 is disposed on the side of the first end part 90e1 in the discharge space 93, and the second electrode 92 is disposed on the side of the second end part 90e2 in the discharge space 93. The shapes of the first electrode 91 and the second electrode 92 are a rod shape which extends along the optical axis AX. In the discharge space 93 an electrode tip end part (also, referred to as a "discharge end") of the first electrode 91 and an electrode tip end part of the second electrode 92 are spaced by a predetermined distance to face each other. The material of the first electrode 91 and the second electrode 92 is metal such as tungsten.

A first terminal 951 is installed in the first end part 90e1 of the discharge lamp 90. The first terminal 951 and the first electrode 91 are electrically connected to each other by a conductive member 941 which passes through the inside of the discharge lamp 90. Similarly, a second terminal 952 is installed in the second end part 90e2 of the discharge lamp 90. The second terminal 952 and the second electrode 92 are electrically connected to each other by a conductive member 942 which passes through the inside of the discharge lamp 90. The material of the first terminal 951 and the second terminal 952 is metal such as tungsten. Further, as the conductive members 941 and 942, for example, a molybdenum foil is used.

The first terminal 951 and the second terminal 952 are connected to the discharge lamp lighting device 1. The discharge lamp lighting device 1 supplies alternating current to the first terminal 951 and the second terminal 952. As a result, arc discharge occurs between the first electrode 91 and the second electrode 92. Light (discharge light) generated by the arc discharge is emitted in all directions from the discharge position as indicated by an arrow of a broken line.

The main reflection mirror 112 is fixed to the first end part 90e1 of the discharge lamp 90 by a fixing member 961. The shape of a reflection surface (surface on the side of the discharge lamp 90) of the main reflection mirror 112 is a revolved elliptical shape. The main reflection mirror 112 reflects the discharge light along the irradiation direction D. The shape of the reflection surface of the main reflection mirror 112 is not limited to the revolved elliptical shape, and various shapes which are able to reflect the discharge light in the irradiation direction D may be employed. For example, a revolved parabola shape may be employed. In this case, the main reflection mirror 112 is capable of converting the discharge light into light which is approximately parallel to the optical axis AX. Accordingly, it is possible to omit the collimating lens 305.

The sub reflection mirror 50 is fixed to the side of the second end part 90e2 of the discharge lamp 90 by a fixing member 962. The shape of a reflection surface (surface on the side of the discharge light 90) of the sub reflection mirror 50 is a spherical shape which surrounds the discharge space 93 on the side of the second end part 90e2. The sub reflection mirror 50 reflects the discharge light toward the main reflection mirror 112. Thus, it is possible to increase usage efficiency of the light emitted from the discharge space 93.

As the material of the fixing members 961 and 962, an arbitrary heat resistance material (for example, inorganic adhesive) which stands heat generation of the discharge lamp 90 may be employed. Further, as a method of fixing the arrangement of the main reflection mirror 112 and the sub reflection mirror 50, a method is not limited to a method of fixing the main reflection mirror 112 and the sub reflection mirror 50 to the discharge lamp 90, and an arbitrary method may be employed. For example, the discharge lamp 90 and the main reflection mirror 112 may be independently fixed to a housing (not shown) of the projector 500. This is similarly applied to the sub reflection mirror 50.

1-2. Circuit Configuration of Projector According to the Present Embodiment

Figure 4:
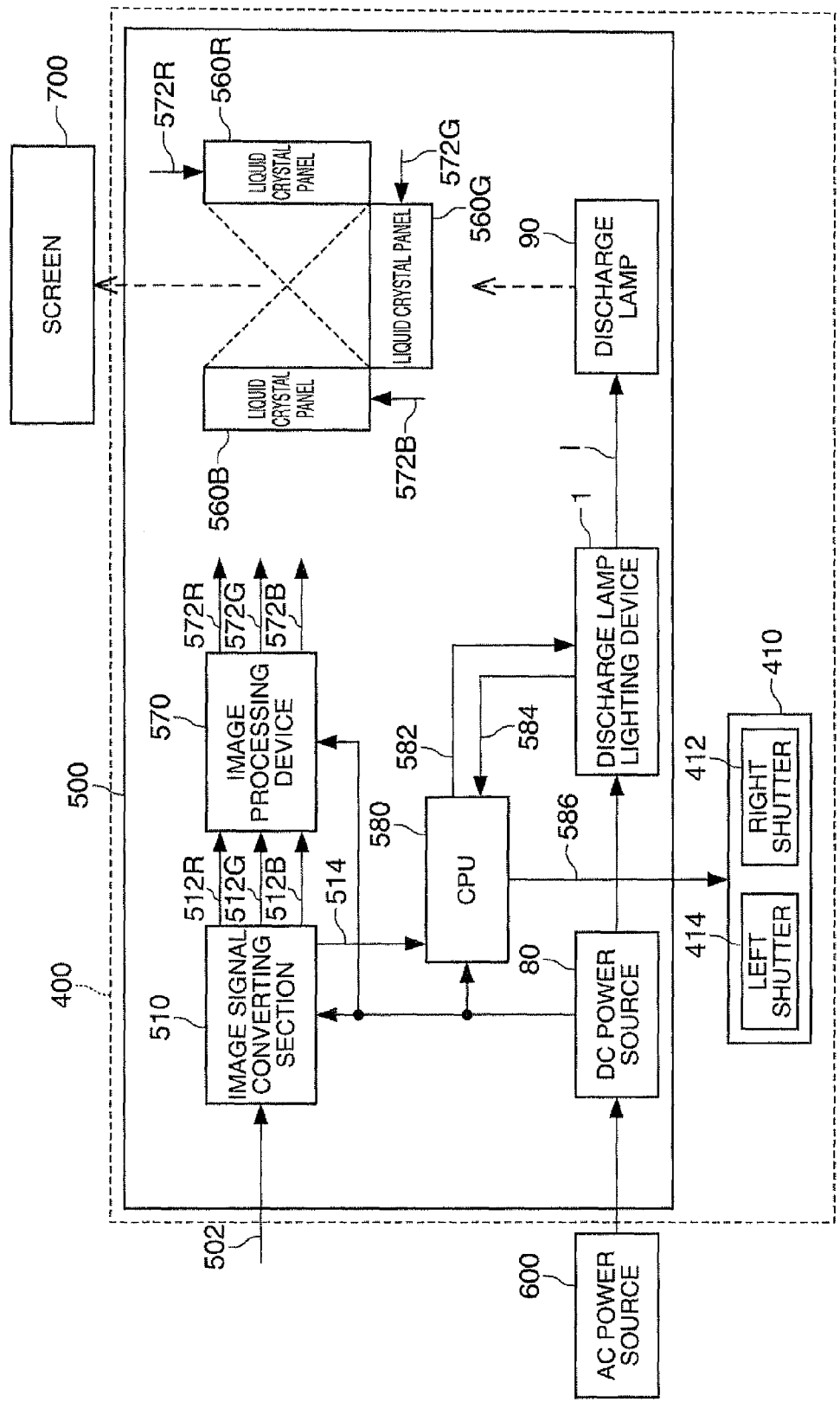
FIG. 4 is a circuit diagram illustrating a circuit configuration of the projector according to the present embodiment.

FIG. 4 is a circuit diagram illustrating a circuit configuration of the projector 500 according to the present embodiment. The projector 500 may include an image signal converting section 510, a DC power source 80, an image processing device 570, and a CPU (Central Processing unit) 580, in addition to the optical system described above. Further, the projector 500 may be configured as a projector system 400 which includes the projector 500 and active shutter glasses 410.

The image signal converting section 510 converts an image signal 502 (luminance—color difference signals, analog RGB signals and the like) input from the outside into digital RGB signals of a predetermined word length to generate image signals 512R, 512G and 512B, and then supplies the result to the image processing device 570.

The image processing device 570 performs image processing for each of three image signals 512R, 512G and 512B, and supplies drives signals 572R, 572G and 572B for respectively driving the liquid crystal panels 560R, 560G and 560B to the liquid crystal panels 560R, 560G and 560B. On the basis of the drive signals 572R, 572G and 572B input to the liquid crystal panels 560R, 560G and 560B, the image 710 is projected onto the screen 700 by the optical system described with reference to FIG. 2.

The DC power source 80 converts AC voltage supplied from an external AC power source 600 into a constant DC voltage, and supplies the DC voltage to the image signal converting section 510 which is on the secondary side of a transformer (which is not shown, but is included in the DC power source 80), the image processing device 570 and the discharge lamp lighting device 1 which is on the first side of the transformer.

The discharge lamp lighting device 1 generates high voltage between the electrodes of the discharge lamp 90 at the time of start-up and causes insulation breakdown to form a discharge path, and then, supplies drive current I for maintaining the discharge of the discharge lamp 90.

The liquid crystal panels 560R, 560G and 560B modulate the luminance of the color light incident on each liquid crystal panel through the optical system described above, on the basis of each of the drive signals 572R, 572G and 572B.

The CPU 580 controls an operation from the start of lighting to the extinguishing of the projector 500. For example, a lighting command or an extinguishing command may be output to the discharge lamp lighting device 1 through a communication signal 582. Further, the CPU 580 may receive lighting information indicating a lighting state of the discharge lamp 90 from the discharge lamp lighting device 1 through a communication signal 584.

Further, the CPU 580 may output a control signal 586 for controlling the active shutter glasses 410 in synchronization with the image signal 502 to the active shutter glasses 410 through wired or wireless communication means, on the basis of a sync signal 514 output from the image signal converting section 510.

The active shutter glasses 410 may include a right shutter 412 and a left shutter 414. The right shutter 412 and the left shutter 414 are controlled to be opened or closed on the basis of the control signal 586. In a case where a user wears the active shutter glasses 410, as the right shutter 412 is closed, a visual field on the right eye side may be blocked. Further, in a case where the user wears the active shutter glasses 410, as the left shutter 414 is closed, a visual field on the left eye side may be blocked. The right shutter 412 and the left shutter 414 may include a liquid crystal shutter, for example.

Figure 5:
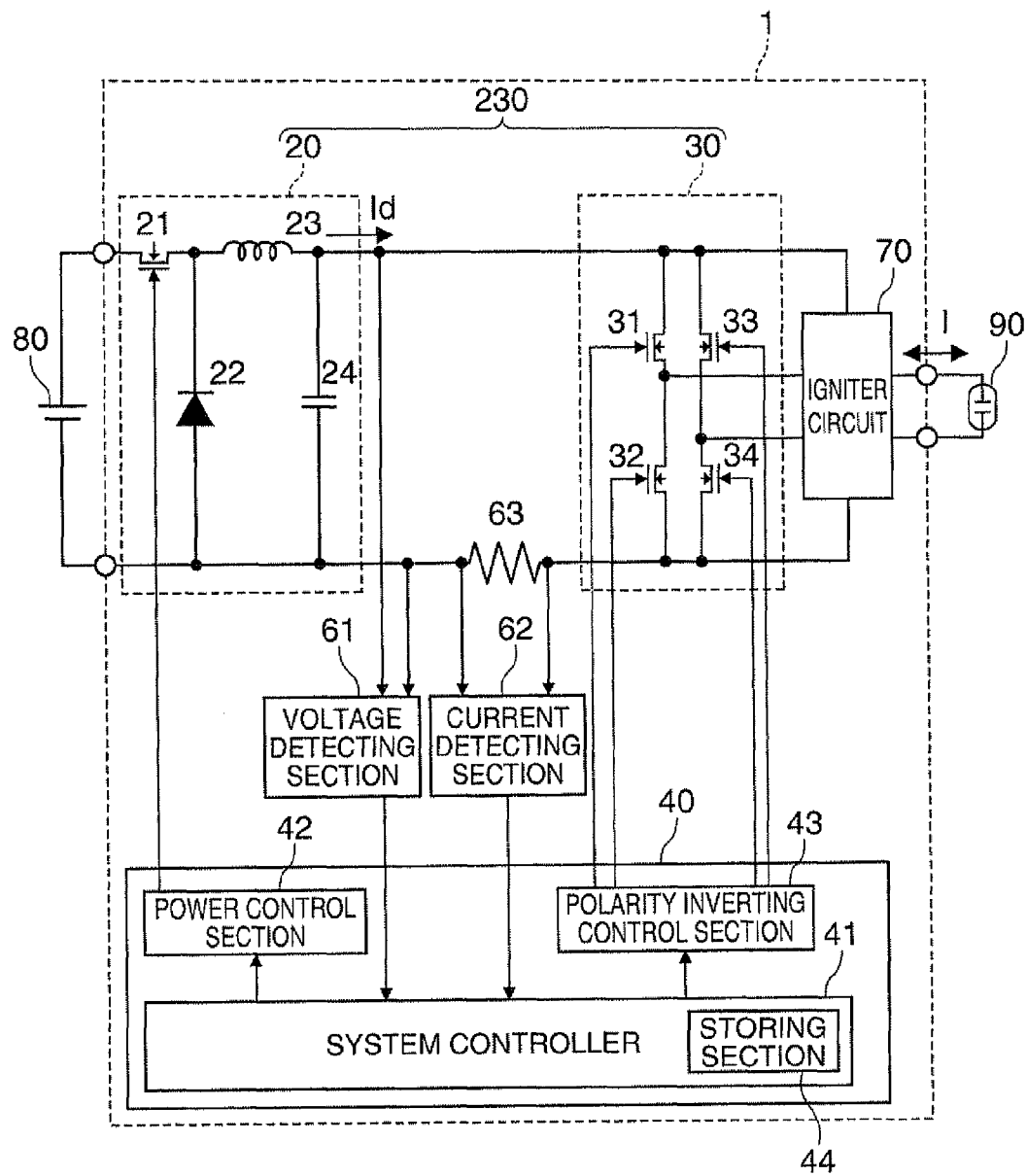
FIG. 5 is a circuit diagram illustrating a circuit configuration of a discharge lamp lighting device according to the present embodiment.

1-3. Configuration of Discharge Lamp Lighting Device According to the Present Embodiment FIG. 5 is a circuit diagram illustrating a circuit configuration of the discharge lamp lighting device 1 according to the present embodiment.

The discharge lamp lighting device 1 includes a power controlling circuit 20. The power controlling circuit 20 generates drive power to be supplied to the discharge lamp 90. In the present embodiment, the power controlling circuit 20 includes a down chopper circuit which lowers voltage input from the DC power source 80 and outputs direct current Id.

The power controlling circuit 20 may include a switch element 21, a diode 22, a coil 23 and a capacitor 24. The switch element 21 may include a transistor, for example. In the present embodiment, one end of the switch element 21 is connected to the positive voltage side of the DC power source 80, and the other end thereof is connected to a cathode terminal of the diode 22 and one end of the coil 23. Further, one end of the capacitor 24 is connected to the other end of the coil 23, and the other end of the capacitor 24 is connected to an anode terminal of the diode 22 and the negative voltage side of the DC power source 80. A power control signal is input to a control terminal of the switch element 21 from a control section 40 (which will be described later) to control ON/OFF of the switch element 21. A PWM (Pulse Width Modulation) control signal, for example, may be used as the power control signal.

Here, if the switch element 21 is turned on, an electric current flows in the coil 23, and energy is accumulated in the coil 23. Then, if the switch element 21 is turned off, the energy accumulated in the coil 23 is discharged from a path passing the capacitor 24 and the diode 22. As a result, the direct current Id based on the ratio to the time when the switch element 21 is turned on is generated.

The discharge lamp lighting device 1 includes a polarity inverting circuit 30. The polarity inverting circuit 30 receives the direct current Id output from the power controlling circuit 20 and performs polarity inversion at a predetermined timing to generate and output drive current I which is direct current which is continued for a controlled time or alternating current which has an arbitrary frequency. In the present embodiment, the polarity inverting circuit 30 includes an inverter bridge circuit (full bridge circuit).

The polarity inverting circuit 30 includes a first switch element 31, a second switch element 32, a third switch element 33 and a fourth switch element 34 which include a transistor or the like, and is configured by connecting the first switch element 31 and the second switch element 32 which are connected in series and the third switch element 33 and the fourth switch element 34 which are connected in series, in parallel with each other. Polarity inverting control signals are respectively input to control terminals of the first switch element 31, the second switch element 32, the third switch element 33 and the fourth switch element 34 from the control section 40, to control ON/OFF operations of the first switch element 31, the second switch element 32, the third switch element 33 and the fourth switch element 34.

By alternately repeating the ON/OFF operations of the first switch element 31 and the fourth switch element 34, and the ON/OFF operations of the second switch element 32 and the third switch element 33, the polarity inverting circuit 30 alternately inverts the polarity of the direct current Id output from the power controlling circuit 20, and generates and outputs the drive current I which is direct current which is continued for the controlled time or alternating current which has a controlled frequency, from a common connection point of the first switch element 31 and the second switch element 32 and a common connection point of the third switch element 33 and the fourth switch element 34.

That is, when the first switch element 31 and the fourth switch element 34 are turned on, the second switch element 32 and the third switch element 33 are controlled to be turned off, and when the first switch element 31 and the fourth switch element 34 are turned off, the second switch element 32 and the third switch element 33 are controlled to be turned on. Accordingly, when the first switch element 31 and the fourth switch element 34 are turned on, the drive current I which flows in the order of the first switch element 31, the discharge lamp 90 and the fourth switch element 34 from one end of the capacitor 24, is generated. Further, when the second switch element 32 and the third switch element 33 are turned on, the drive current I which flows in the order of the third switch element 33, the discharge lamp 90 and the second switch element 32 from one end of the capacitor 24, is generated.

In the present embodiment, the power controlling circuit 20 and the polarity inverting circuit 30 correspond, in combination, to a discharge lamp drive section 230. That is, the discharge lamp drive section 230 supplies the drive current I to the discharge lamp 90 to supply drive power to the discharge lamp 90.

The discharge lamp lighting device 1 includes the control section 40. The control section 40 controls the power controlling circuit 20 and the polarity inverting circuit 30 to control the drive power supplied to the discharge lamp 90, a holding time when the drive current I is continued with the same polarity, an electric current value and the frequency of the drive current I, and the like. The control section 40 controls the electric current value of the direct current Id output to the power controlling circuit 20, to thereby perform a drive power control for controlling the drive power supplied to the discharge lamp 90. Further, according to a polarity inverting timing of the drive current I with respect to the polarity inverting circuit 30, the control section 40 performs a polarity inverting control for controlling the holding time when the drive current I is continued with the same polarity, the frequency of the drive current I, and the like.

The configuration of the control section 40 is not particularly limitative, but in the present embodiment, the control section 40 includes a system controller 41, a power control section 42 and a polarity inverting control section 43. A part or the entirety of the control section 40 may be configured by a semiconductor integrated circuit.

The system controller 41 controls the power control section 42 and the polarity inverting control section 43 to control the power controlling circuit 20 and the polarity inverting circuit 30. The system controller 41 may control the power control section 42 and the polarity inverting control section 43, on the basis of the drive voltage Vla of the discharge lamp 90 detected by a voltage detecting section 61 (which will be described later) and the drive current I of the discharge lamp 90 detected by a current detecting section 62 (which will be described later).

In the present embodiment, the system controller 41 includes a storing section 44. The storing section 44 may be installed independently of the system controller 41.

The system controller 41 may control the power controlling circuit 20 and the polarity inverting circuit 30, on the basis of information stored in the storing section 44. In the storing section 44, for example, information relating to drive parameters such as a holding time when the drive current I is continued with the same polarity, and an electric current value, frequency, waveform, and modulation pattern of the drive current I, may be stored.

The power control section 42 outputs a power control signal to the power controlling circuit 20 on the basis of the control signal from the system controller 41 to control the power controlling circuit 20.

The polarity inverting control section 43 outputs a polarity inverting control signal to the polarity inverting circuit 30 on the basis of the control signal from the system controller 41 to control the polarity inverting circuit 30.

The control section 40 may be realized by an exclusive circuit to perform the above-mentioned controls or various controls of processes to be described later, but for example, the CPU may function as a computer by executing a control program stored in the storing section 44 or the like to perform various controls of these processes.

Further, in an example shown in FIG. 5, the control section 40 is configured as a part of the discharge lamp lighting device 1, but the CPU 580 may perform a part or all of the functions of the control section 40.

The discharge lamp lighting device 1 includes the voltage detecting section 61. The voltage detecting section 61 detects the drive voltage Vla of the discharge lamp 90, and then outputs information about the drive voltage to the control section 40.

The discharge lamp lighting device 1 may include the current detecting section 62. The current detecting section 62 detects the drive current I of the discharge lamp 90 and outputs information about the drive current to the control section 40. In the present embodiment, the current detecting section 62 detects voltage generated in a resistor 63 which is connected in series to the discharge lamp 90, to detect the drive current T of the discharge lamp 90.

Further, the voltage detecting section 61 and the current detecting section 62 may be respectively realized by an exclusive circuit to perform the above-described detection, but for example, the CPU may also function as a computer by executing a control program stored in a storing section (not shown) or the like to perform the above-described detection.

Further, the control section 40, the voltage detecting section 61 and the current detection section 62 may be independently configured, or may be integrally configured by one CPU.

The discharge lamp lighting device 1 may include an igniter circuit 70. The igniter circuit 70 is operated only when the discharge lamp 90 starts lighting, and causes insulation-breakdown between the electrodes (between the first electrode 91 and the second electrode 92) of the discharge lamp 90 when the discharge lamp 90 starts lighting and supplies a high voltage (voltage higher than voltage when the discharge lamp 90 is normally lighted) necessary for forming a discharge path between the electrodes (between the first electrode 91 and the second electrode 92) of the discharge lamp 90. In the present embodiment, the igniter circuit 70 is connected to the discharge lamp 90 in parallel.

Figure 6A:
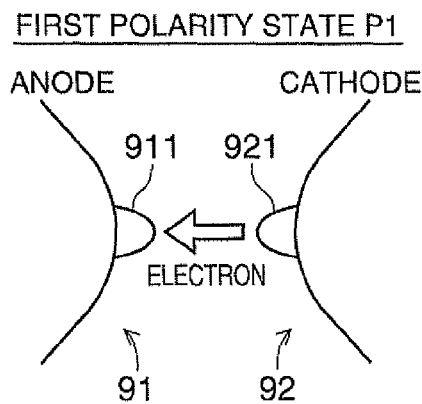
FIGS. 6A to 6D are diagrams illustrating the relationship between the polarity of a drive current supplied to a discharge lamp and the temperature of an electrode.
Figure 6B:
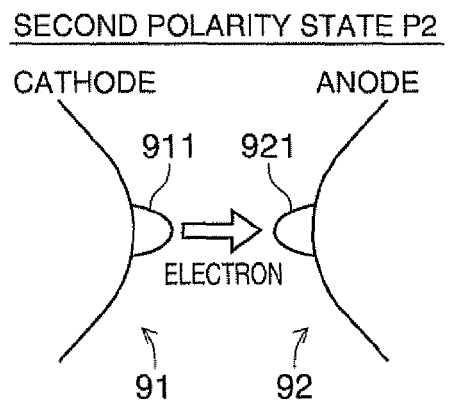

1-4. Relationship Between Polarity of Drive Current and Temperature of Electrode FIGS. 6A to 6D are diagrams illustrating the relationship between the polarity of the drive current I supplied to the discharge lamp 90 and the temperature of the electrode. FIGS. 6A and 6B show operation states of the first electrode 91 and the second electrode 92. In the figure, the tip end parts of the first electrode 91 and the second electrode 92 are shown. Protrusions 911 and 921 are respectively formed at the tip ends of the first electrode 91 and the second electrode 92. Discharge occurring between the first electrode 91 and the second electrode 92 mainly occurs between the protrusion 911 and the protrusion 921. In the examples shown in FIGS. 6A and 6B, compared with a case where the protrusions are not formed, it is possible to prevent movement of the discharge position (arc position) in the first electrode 91 and the second electrode 92. However, such a protrusion may be omitted.

FIG. 6A shows a first polarity state P1 in which the first electrode 91 is operated as the anode and the second electrode 92 is operated as the cathode. In the first polarity state P1, electrons move to the first electrode 91 (anode) from the second electrode 92 (cathode) by discharge. The electrons are discharged from the cathode (second electrode 92). The electrons discharged from the cathode (second electrode 92) collide with the tip end of the anode (first electrode 91). Heat is generated by the collision, and thus, the temperature of the tip end (protrusion 911) of the anode (first electrode 91) is increased.

FIG. 6B shows a second polarity state P2 in which the first electrode 91 is operated as the cathode and the second electrode 92 is operated as the anode. In the second polarity state P2, contrary to the first polarity state P1, electrons move to the second electrode 92 from the first electrode 91. As a result, the temperature of the tip end (protrusion 921) of the second electrode 92 is increased.

In this way, the temperature of the anode is easily increased compared with the cathode. Here, a state in which the temperature of one electrode is higher than the temperature of the other electrode is continued may cause various problems. For example, in a case where the tip end of the high temperature electrode is excessively melted, unintentional electrode deformation may occur. As a result, the length of arc may be deviated from an appropriate value. Further, in a case where the tip end of the low temperature electrode is insufficiently melted, minute concaves and convexes generated at the tip end may remain without being melted. Consequently, a so-called arc jump may occur (arc position moves without stability).

Figure 6C:
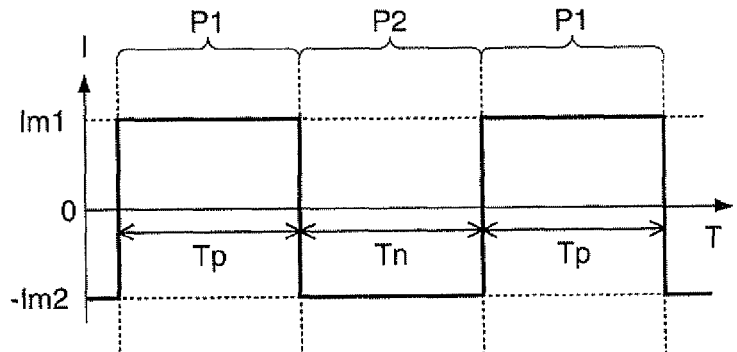

As a technology of suppressing such a problem, an AC driving which supplies alternating current in which the polarity of each electrode is repeatedly switched to the discharge lamp 90 as the drive current I, may be used. FIG. 6C is a timing chart illustrating an example of the drive current I supplied to the discharge lamp 90. The horizontal axis represents time T, and the vertical axis represents an electric current value of the drive current I. The drive current I shows an electric current which flows in the discharge lamp 90. A positive value represents the first polarity state P1, and a negative value represents the second polarity state P2. In the example shown in FIG. 6C, square wave alternating current is used as the drive current I. Further, in the example shown in FIG. 6C, the first polarity state P1 and the second polarity state 22 are alternately repeated. Here, a first polarity segment Tp represents the time when the first polarity state P1 is continued, and a second polarity segment Tn represents the time when the second polarity state P2 is continued. Further, in the example shown in FIG. 6C, an average current value of the first polarity segment Tp is Im1, and an average current value of the second polarity segment Tn is −Im2. Further, the frequency of the drive current I suitable for the driving of the discharge lamp 90 may be experimentally determined according to characteristics of the discharge lamp 90 (for example, a value in the range of 30 Hz to 1 kHz is used). The other values Im1, −Im2, Tp and Tn may be similarly experimentally determined.

Figure 6D:
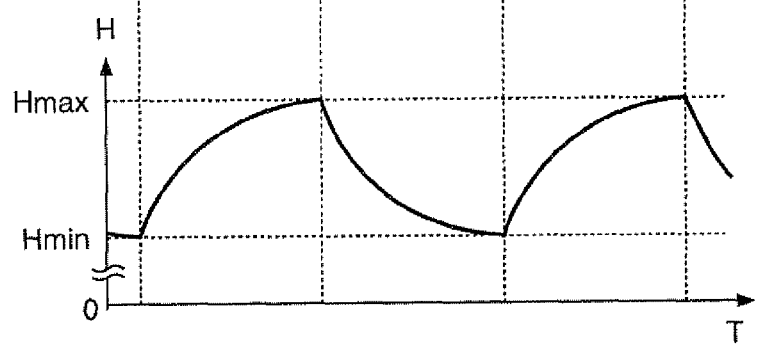

FIG. 6D is a timing chart illustrating temperature change of the first electrode 91. The horizontal axis represents time T, and the vertical axis represents temperature H. In the first polarity state 21, the temperature H of the first electrode 91 is increased, and in the second polarity state P2, the temperature H of the first electrode 91 is decreased. Further, since the first polarity state P1 and the second polarity state P2 are repeated, the temperature H is periodically changed between a minimum value Hmin and a maximum value Hmax. Although not shown, the temperature of the second electrode 92 is changed in a phase opposite to the temperature H of the first electrode 91. That is, in the first polarity state P1, the temperature of the second electrode 92 is decreased, and in the second polarity state P2, the temperature of the second electrode 92 is increased.

In the first polarity state P1, since the tip end of the first electrode 91 (protrusion 911) is melted, the tip end of the first electrode 91 (protrusion 911) becomes smooth. Thus, it is possible to suppress movement of the discharge position in the first electrode 91. Further, since the temperature of the tip end of the second electrode 92 (protrusion 921) is decreased, excessive melting of the second electrode 92 (protrusion 921) is suppressed. Thus, it is possible to suppress unintentional electrode deformation. In the second polarity state P2, the roles of the first electrode 91 and the second electrode 92 are reversed. Accordingly, by repeating the first polarity state P1 and the second polarity state P2, it is possible to suppress the problem in each of the first electrode 91 and the second electrode 92.

Here, in a case where the waveform of the drive current I is symmetric, that is, the waveform of the drive current I satisfies a condition that "|Im1|=|−Im2| and Tp=Tn", conditions of the supplied power are the same between the first electrode 91 and the second electrode 92. Accordingly, it is inferred that, if thermal conditions (the ease with which temperature is increased or decreased) of the first electrode 91 and the second electrode 92 are the same, a temperature difference between the first electrode 91 and the second electrode 92 is reduced.

Further, if the electrode is excessively heated over a wide range (arc spot (hot spot on the electrode surface according to arc discharge) becomes large)), the shape of the electrode is deformed by the excessive melting. Contrarily, if the electrode becomes too cold, the tip end of the electrode may not be sufficiently melted, and the tip end is hardly smooth, that is, the tip end of the electrode is easily deformed.

Further, since the temperature of the electrode is increased if the drive current I of the discharge lamp 90 is increased, thermionic emission from the electrode is increased. Thus, the drive voltage Vla of the discharge lamp 90 is decreased. Contrarily, since the temperature of the electrode is decreased if the drive current I of the discharge lamp 90 is decreased, thermionic emission from the electrode is decreased. Thus, the drive voltage Vla of the discharge lamp 90 is increased.

1-5. Control Example of Drive Current According to the Present Embodiment

Next, a specific example of the control of the drive current I in the discharge lamp lighting device 1 according to the present embodiment will be described.

Figure 7:
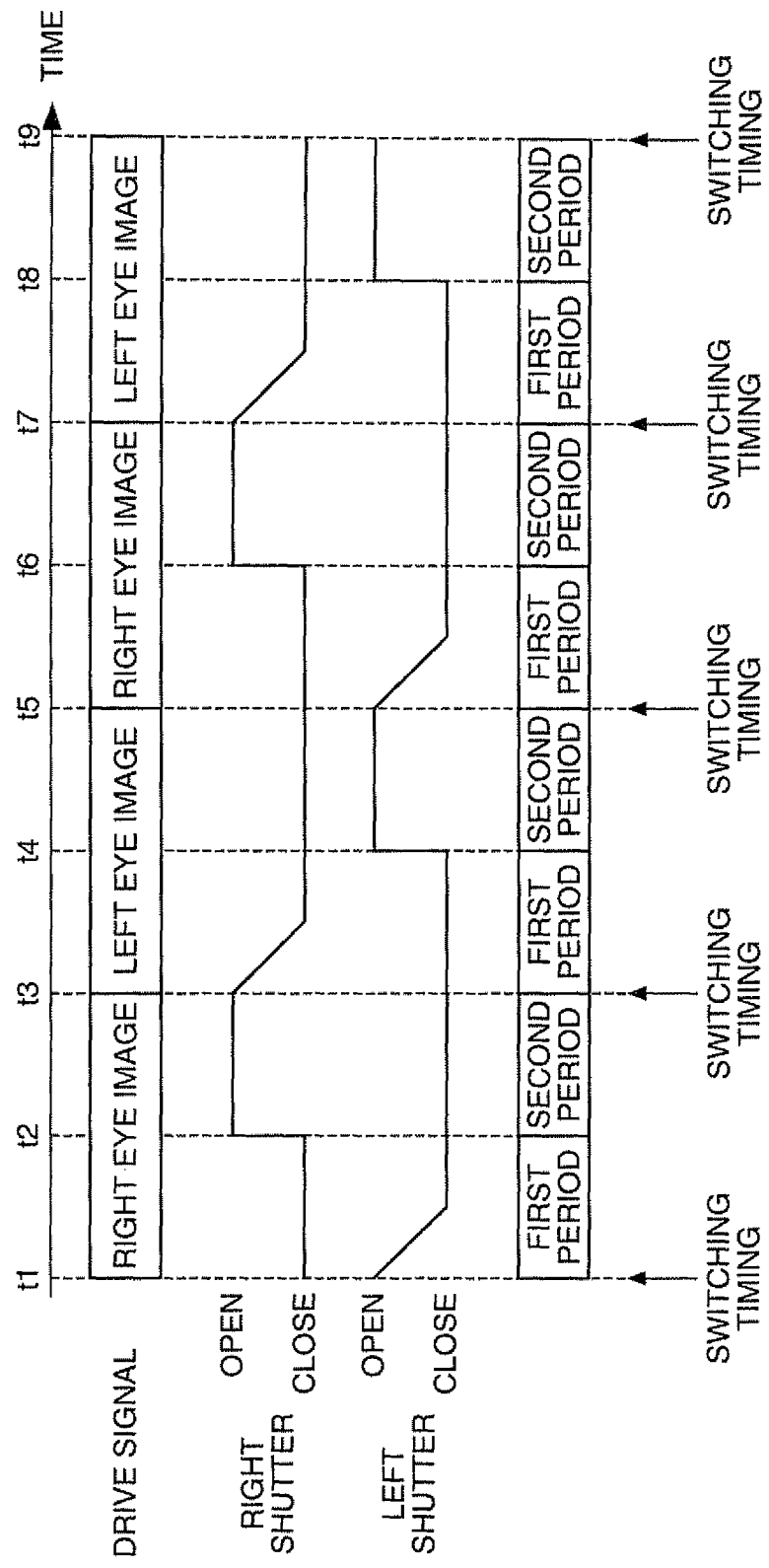
FIG. 7 is a diagram illustrating a first period, a second period and a switching timing.

FIG. 7 is a diagram illustrating a first period, a second period and a switching timing. In FIG. 7, the content of the drive signals 572R, 572G and 572B, the opened and closed state of the right shutter 412, the opened and closed state of the left shutter 414, and the temporal relationship between the first period, the second period and the switching timing are shown sequentially from the top. The horizontal axis in FIG. 7 represents time. Hereinafter, an example in which an observer stereoscopically views a display image using a first image and a second image as a left eye image and a right eye image, respectively, will be described.

In the example shown in FIG. 7, the drive signals 572R, 572G and 572B are drive signals corresponding to the right eye image as the first image from a time t1 to a time t3, the left eye image as the second image from the time t3 to a time t5, the right eye image as the first image from the time t5 to a time t7, and the left eye image as the second image from the time t7 to a time t9. Accordingly, in the example shown in FIG. 7, the projector 500 switches and alternately outputs the right eye image as the first image and the left eye image as the second image, using the time t1, the time t3, the time t5, the time t7 and the time t9 as switching timings.

A period interposed between the switching timings which are temporally adjacent to each other starts in the first period and ends in the second period. In the example shown in FIG. 7, for example, a period interposed between the time t1 and the time t3 which are the switching timings starts in a first period from the time t1 to the time t2 and ends in a second period from the time t2 to the time t3. This is similarly applied to a period interposed between the time t3 and the time t5 which are the switching timings, a period interposed between the time t5 and the time t7 which are the switching timings, and a period interposed between the time t7 and the time t9 which are the switching timings. Further, in the example shown in FIG. 7, the length of the first period and the length of the second period are set to be the same, but the length of the first period and the length of the second period may be appropriately set as necessary, respectively. Further, in addition to the first period and the second period, a third period may be present. In the third period, a control different from the control of the drive current T in the first period and the second period (which will be described later) may be performed.

The right shutter 412 enters the opened state in at least a part of the period when the drive signals 572R, 572G and 572B corresponding to the right eye image as the first image are input to the liquid crystal panels 560R, 560G and 560B. In the example shown in FIG. 7, the right shutter 412 is in the closed state from the time t1 to the time t2, and then, is in the opened state from the time t2 to the time t3. Further, in the example shown in FIG. 7, in at least a part of the period when the drive signals 572R, 572G and 5723 corresponding to the left eye image as the second image are input to the liquid crystal panels 560R, 560G and 560B, the right shutter 412 starts to be closed from the time t3, is completely closed between the time t3 and the time t4, and then, is in the closed state from the time t4 to the time t5. The change in the opened and closed states of the right shutter 412 between the time t5 and the time t9 is the same as the change in the opened and closed states between the time t1 and the time t5.

The left shutter 414 enters the opened state in at least a part of the period when the drive signals 572R, 572G and 5723 corresponding to the left eye image as the second image are input to the liquid crystal panels 560R, 560G and 560B. In the example shown in FIG. 7, the left shutter 414 is in the closed state from the time t3 to the time t4, and then, is in the opened state from the time t4 to the time t5. Further, in the example shown in FIG. 7, in at least a part of the period when the drive signals 572R, 572G and 572B corresponding to the right eye image as the first image are input to the liquid crystal panels 560R, 560G and 560B, the left shutter 414 starts to be closed from the time t1, is completely closed between the time t1 and the time t2, and then, is in the closed state from the time t2 to the time t3. The change in the opened and closed states of the left shutter 414 between the time t5 and the time t9 is the same as the change in the opened and closed states between the time t1 and the time t5.

Further, in the example shown in FIG. 7, in the period when the drive signals 572R, 572G and 572B corresponding to the right eye image as the first image are input to the liquid crystal panels 560R, 560G and 560B, the period when the right shutter 412 is closed corresponds to the first period, and the period when the right shutter 412 is opened corresponds to the second period. Further, in the example shown in FIG. 7, in the period when the drive signals 572R, 572G and 572B corresponding to the left eye image as the second image are input to the liquid crystal panels 560R, 560G and 560B, the period when the left shutter 414 is closed corresponds to the first period, and the period when the left shutter 414 is opened corresponds to the second period. Further, in the example shown in FIG. 7, in the first period, a period when all of the right shutter 412 and the left shutter 414 are closed is present.

Figure 8A:
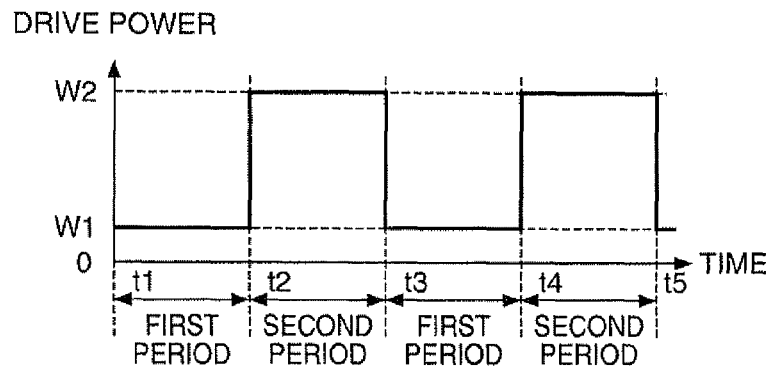
FIG. 8A is a graph illustrating a control example of drive power using the discharge lamp lighting device according to the present embodiment.
Figure 8B:
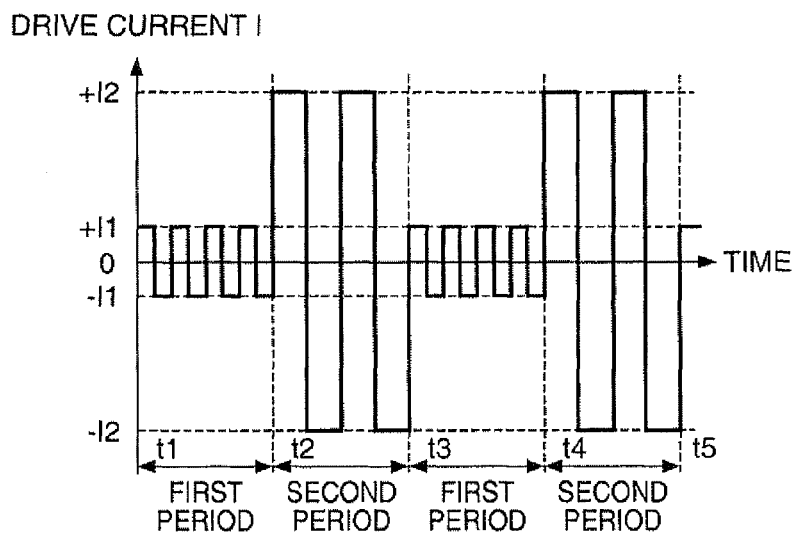
FIG. 8B is a graph illustrating a control example of a drive current using the discharge lamp lighting device according to the present embodiment.
Figure 8C:
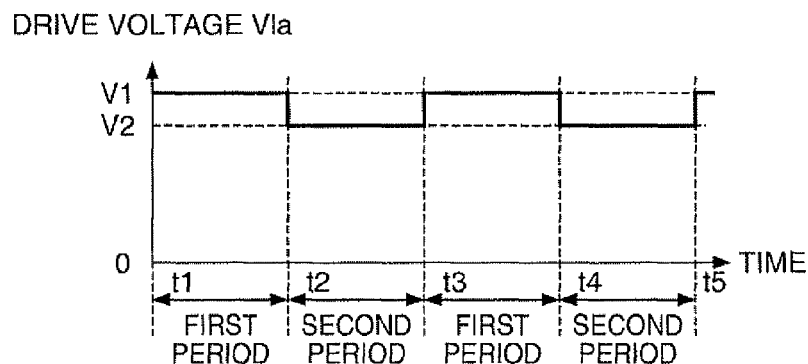
FIG. 8C is a graph illustrating an example of a drive voltage using the discharge lamp lighting device according to the present embodiment.

FIG. 8A is a graph illustrating a control example of the drive power using the discharge lamp lighting device 1 according to the present embodiment, FIG. 8B is a graph illustrating a control example of the drive current I using the discharge lamp lighting device 1 according to the present embodiment, and FIG. 8C is a graph illustrating an example of the drive voltage Vla using the discharge lamp lighting device 1 according to the present embodiment. The horizontal axis in FIGS. 8A to 8C represents time. The vertical axis in FIG. 8A represents the drive power, the vertical axis in FIG. 8B represents the drive current I, and the vertical axis in FIG. 8C represents the drive voltage Vla.

In the discharge lamp lighting device 1 according to the present embodiment, the control section 40 performs a first control process of controlling the discharge lamp drive section 230 so that the electric power supplied to the discharge lamp 90 becomes a first power W1, and a second control process of controlling the discharge lamp drive section 230 so that the electric power supplied to the discharge lamp 90 becomes a second power W2 different from the first power W1. Here, the control section 40 controls the discharge lamp drive section 230 on the basis of the drive voltage Vla of the discharge lamp 90 detected by the voltage detecting section 61 in a period when the first control process is previously performed, in the first control process, and controls the discharge lamp drive section 230 on the basis of the drive voltage Vla of the discharge lamp 90 detected by the voltage detecting section 61 in a period when the second control process is previously performed, in the second control process.

In the example shown in FIG. 8A, the drive power supplied to the discharge lamp 90 is the first power W1 in the first period, and is the second power W2 different from the first power W1 in the second period. That is, the control section 40 performs the first control process in the first period and performs the second control process in the second period. Further, in the example shown in FIG. 8A, the relationship of first power W1<second power W2 is established. The value of the drive power may be experimentally determined according to specification of the discharge lamp 90. Further, the length of the first period and the length of the second period may be experimentally determined according to specification of the discharge lamp 90.

FIG. 8B shows the control example of the drive current I in a case where the discharge lamp 90 is driven with the drive power pattern shown in FIG. 8A. In the example shown in FIG. 8B, the drive current I is alternating current in which the electric current value is in the range of +I1 to −I1 in the first period, and is alternating current in which the electric current value is in the range of +I2 to −I2, in the second period. Generally, in order to increase the drive power of the discharge lamp 90, the drive current I of the discharge lamp 90 is increased. Accordingly, in FIG. 8B, the relationship of I1<I2 is established.

FIG. 8C schematically shows a general inclination of the drive voltage Vla of the discharge lamp 90 in a case where the discharge lamp 90 is driven with the drive power pattern shown in FIG. 8A. In the example shown in FIG. 8C, the voltage value of the drive voltage Vla in the first period is V1, and the voltage value of the drive voltage Vla in the second period is V2. Further, in the example shown in FIG. 8C, the relationship of V1>V2 is established.

Since the temperature of the electrode is increased if the drive current I of the discharge lamp 90 is increased, thermionic emission from the electrode is increased. Thus, the drive voltage Vla of the discharge lamp 90 is decreased. Contrarily, since the temperature of the electrode is decreased if the drive current I of the discharge lamp 90 is decreased, thermionic emission from the electrode is decreased. Thus, the drive voltage Vla of the discharge lamp 90 is increased. Accordingly, the drive voltage Vla becomes relatively large in the first period and becomes relatively small in the second period.

In the discharge lamp lighting device 1 according to the present embodiment, the control section 40 controls the discharge lamp drive section 230 on the basis of the drive voltage Vla of the discharge lamp 90 detected by the voltage detecting section 61 in the period when the first control process is previously performed, in the first control process. For example, in the first period from the time t3 to the time t4, the control section 40 may control the discharge lamp drive section 230 on the basis of the drive voltage Vla of the discharge lamp 90 detected by the voltage detecting section 61 in the first period from the time t1 to the time t2. In the example shown in FIG. 8O, since the voltage value of the drive voltage Vla in the first period is V1, the control section 40 controls the discharge lamp drive section 230 to output the drive current I in which V1×I1 is the first power W1. Further, for example, in the first period from the time t3 to the time t4, the control section 40 may control the discharge lamp drive section 230 on the basis of the average value of the drive voltages Vla of the discharge lamp 90 detected by the voltage detecting section 61 in the plural first periods which are present before (temporally prior to) the time t3.

Similarly, the control section 40 controls the discharge lamp drive section 230 on the basis of the drive voltage Vla of the discharge lamp 90 detected by the voltage detecting section 61 in the period when the second control process is previously performed, in the second control process. For example, in the second period from the time t4 to the time t5, the control section 40 may control the discharge lamp drive section 230 on the basis of the drive voltage Vla of the discharge lamp 90 detected by the voltage detecting section 61 in the second period from the time t2 to the time t3. In the example shown in FIG. 5C, since the voltage value of the drive voltage Vla in the second period is V2, the control section 40 controls the discharge lamp drive section 230 to output the drive current I in which V2×I2 is the second power W2. Further, for example, in the second period from the time t4 to the time t5, the control section 40 may control the discharge lamp drive section 230 on the basis of the average value of the drive voltages Vla of the discharge lamp 90 detected by the voltage detecting section 61 in the plural second periods which are present before (temporally prior to) the time t4.

According to the discharge lamp lighting device 1 in the present embodiment, since the first control process is performed on the basis of the drive voltage Vla of the discharge lamp 90 detected by the voltage detecting section 61 in the period when the first control process is previously performed, and the second control process is performed on the basis of the drive voltage Vla of the discharge lamp 90 detected by the voltage detecting section 61 in the period when the second control process is previously performed, it is possible to control the electric power supplied to the discharge lamp 90 with high accuracy. Accordingly, it is possible to realize a discharge lamp lighting device capable of controlling the brightness of the discharge lamp with high accuracy.

In the discharge lamp lighting device 1 according to the present embodiment, the control section 40 may obtain the drive voltage Vla of the discharge lamp 90 detected by the voltage detecting section 61 in each period when the first control process is performed, and may obtain the drive voltage Vla of the discharge lamp 90 detected by the voltage detecting section 61 in each period when the second control process is performed. In other words, the control section 40 may obtain the drive voltage Via of the discharge lamp 90 detected by the voltage detecting section 61 at least one time in the period when the first control process is performed, and may obtain the drive voltage Vla of the discharge lamp 90 detected by the voltage detecting section 61 at least one time in the period when the second control process is performed. The control section 40 performs the first control process and the second control process on the basis of the obtained drive voltage Vla of the discharge lamp 90.

In the example shown in FIG. 8C, in the first period from the time t1 to the time t2 and in the first period from the time t3 to the time t4, the control section 40 obtains the drive voltage Vla of the discharge lamp 90 detected by the voltage detecting section 61 at least one time, respectively. Similarly, in the second period from the time t2 to the time t3 and in the second period from the time t5 to the time t6, the control section 40 obtains the drive voltage Vla of the discharge lamp 90 detected by the voltage detecting section 61 at least one time, respectively.

The drive voltage Vla of the discharge lamp 90 is changed over time according to the state of deterioration or the like of the electrode of the discharge lamp 90. By obtaining the drive voltage Vla of the discharge lamp 90 detected by the voltage detecting section 61 in each period when the first control process is performed and obtaining the drive voltage Vla of the discharge lamp 90 detected by the voltage detecting section 61 in each period when the second control process is performed, it is possible to obtain the drive voltage Vla of the discharge lamp 90 whenever a target power value is changed, and it is thus possible to control the brightness of the discharge lamp 90 with high accuracy according to the state of the discharge lamp 90.

In the discharge lamp lighting device 1 according to the present embodiment, the control section 40 may obtain the drive voltage Vla of the discharge lamp 90 detected by the voltage detecting section 61 in the second half of the period when the first control process is performed and may obtain the drive voltage Vla of the discharge lamp 90 detected by the voltage detecting section 61 in the second half of the period when the second control process is performed.

Since the temperature of the electrode of the discharge lamp 90 is rapidly changed immediately after the target power value is changed, the value of the drive voltage Vla of the discharge lamp 90 may be unstable. By obtaining the drive voltage Vla of the discharge lamp 90 in the second half of the period when the first control process is performed and in the second half of the period when the second control process is performed, it is possible to obtain the drive voltage Vla of the discharge lamp 90 detected at the timing when the drive voltage Vla of the discharge lamp 90 is stable. Accordingly, it is possible to control the brightness of the discharge lamp 90 with high accuracy.

According to the projector 500 in the present embodiment, since the discharge lamp lighting device 1 capable of controlling the brightness of the discharge lamp 90 with high accuracy is included in the configuration, it is possible to realize a projector capable of controlling the brightness of the discharge lamp 90 with high accuracy.

1-6. Another Control Example of Drive Current According to the Present Embodiment Next, another specific example of the control of the drive current I in the discharge lamp lighting device 1 according to the present embodiment will be described.

Figure 9A:
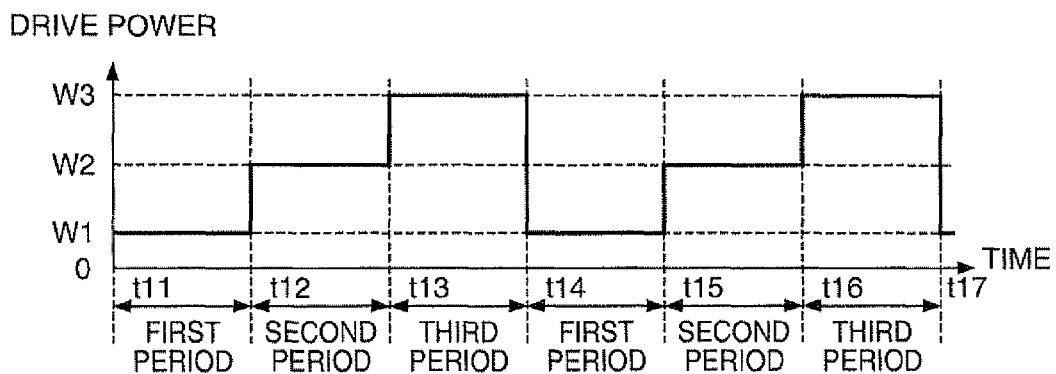
FIG. 9A is a graph illustrating another control example of drive power using the discharge lamp lighting device according to the present embodiment.
Figure 9B:
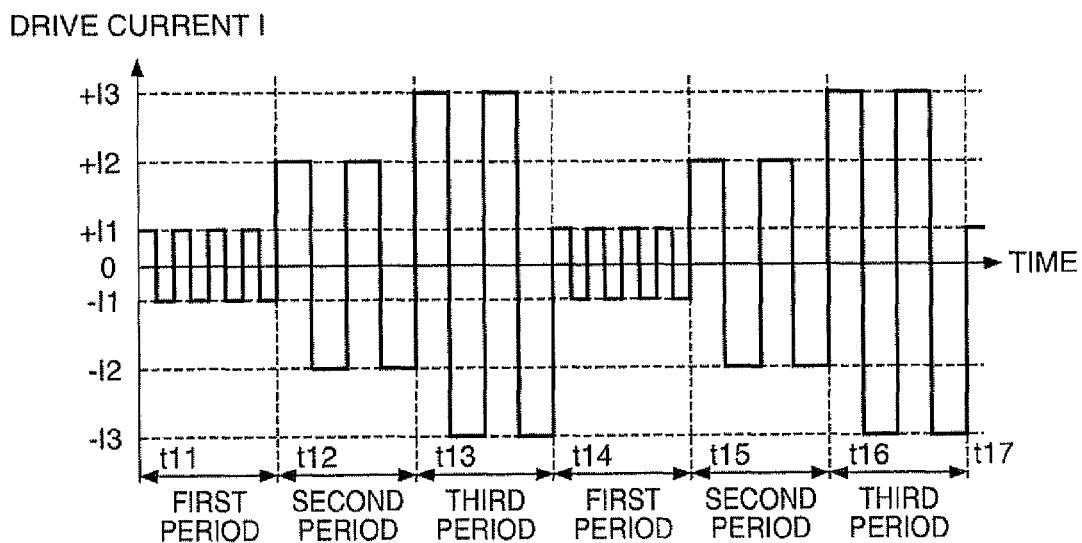
FIG. 9B is a graph illustrating another control example of drive current using the discharge lamp lighting device according to the present embodiment.
Figure 9C:
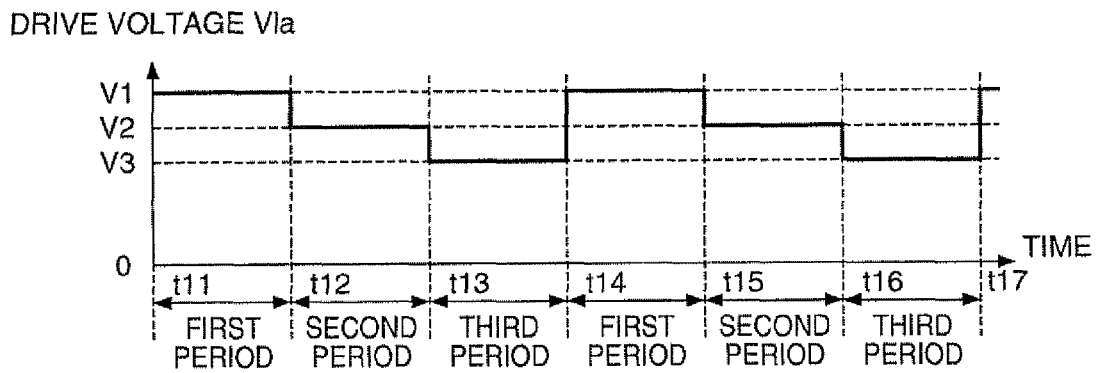
FIG. 9C is a graph illustrating an example of a drive voltage using the discharge lamp lighting device according to the present embodiment.

FIG. 9A is a graph illustrating another control example of the drive power using the discharge lamp lighting device 1 according to the present embodiment, FIG. 9B is a graph illustrating another control example of the drive current I using the discharge lamp lighting device 1 according to the present embodiment, and FIG. 9C is a graph illustrating an example of the drive voltage Vla using the discharge lamp lighting device 1 according to the present embodiment. The horizontal axis in FIGS. 9A to 9O represents time. The vertical axis in FIG. 9A represents the drive power, the vertical axis in FIG. 9B represents the drive current I, and the vertical axis in FIG. 9C represents the drive voltage Vla. In the example shown in FIG. 9A to 9C, names of the first period, the second period and the third period are independent of FIG. 7 and FIGS. 8A to 8C.

The first power W1 and the second power W2 in the present embodiment may be two power values which are arbitrarily selected from three or more power values. In the example shown in FIG. 9A, the relationship of first power W1<second power W2<third power W3 is established.

In the example shown in FIG. 9A, the drive power supplied to the discharge lamp 90 is the first power W1 in the first period, is the second power W2 different from the first power W1 in the second period, and is the third power W3 different from the first power W1 and the second power W2 in the third period. That is, the control section 40 performs the first control process in the first period and performs the second control process in the second process. Further, the control section 40 performs a third control process of controlling the discharge lamp drive section 230 so that the electric power supplied to the discharge lamp 90 becomes the third power W3 in the third period. The value of the drive power may be experimentally determined on the basis of specification of the discharge lamp 90. Further, the length of the first period, the length of the second period and the length of the third period may be experimentally determined on the basis of specification of the discharge lamp 90.

FIG. 9B shows the control example of the drive current I in a case where the discharge lamp 90 is driven with the drive power pattern shown in FIG. 9A. In the example shown in FIG. 9B, the drive current I is alternating current in which the electric current value is in the range of +I1 to −I1, in the first period, is alternating current in which the electric current value is in the range of +I2 to −I2, in the second period, and is alternating current in which the electric current value is in the range of +I3 to −I3, in the third period. Generally, in order to increase the drive power of the discharge lamp 90, the drive current I of the discharge lamp 90 is increased. Accordingly, in FIG. 9B, the relationship of I1<I2<I3 is established.

FIG. 9O schematically shows a general inclination of the drive voltage Vla of the discharge lamp 90 in a case where the discharge lamp 90 is driven with the drive power pattern shown in FIG. 9A. In the example shown in FIG. 9C, the voltage value of the drive voltage Vla in the first period is V1, the voltage value of the drive voltage Vla in the second period is V2, and the voltage value of the drive voltage Vla in the third period is V3. Further, in the example shown in FIG. 9O, the relationship of V1>V2>V3 is established. The reason is because the drive voltage Vla of the discharge lamp 90 has the inclination as shown in FIG. 9C as described above.

In the discharge lamp lighting device 1 according to the present embodiment, the control section 40 controls the discharge lamp drive section 230 on the basis of the drive voltage Vla of the discharge lamp 90 detected by the voltage detecting section 61 in the period when the first control process is previously performed, in the first control process. For example, in the first period from the time t14 to the time t15, the control section 40 may control the discharge lamp drive section 230 on the basis of the drive voltage Vla of the discharge lamp 90 detected by the voltage detecting section 61 in the first period from the time t11 to the time t12. In the example shown in FIG. 9C, since the voltage value of the drive voltage Vla in the first period is V1, the control section 40 controls the discharge lamp drive section 230 to output the drive current I in which V1×I1 is the first power W1. Further, for example, in the first period from the time t14 to the time t15, the control section 40 may control the discharge lamp drive section 230 on the basis of the average value of the drive voltages Vla of the discharge lamp 90 detected by the voltage detecting section 61 in the plural first periods which are present before (temporally prior to) the time t14.

Similarly, the control section 40 controls the discharge lamp drive section 230 on the basis of the drive voltage Vla of the discharge lamp 90 detected by the voltage detecting section 61 in the period when the second control process is previously performed, in the second control process. For example, in the second period from the time t15 to the time t16, the control section 40 may control the discharge lamp drive section 230 on the basis of the drive voltage Vla of the discharge lamp 90 detected by the voltage detecting section 61 in the second period from the time t12 to the time t13. In the example shown in FIG. 9C, since the voltage value of the drive voltage Vla in the second period is V2, the control section 40 controls the discharge lamp drive section 230 to output the drive current I in which V2×I2 is the second power W2. Further, for example, in the second period from the time t15 to the time t16, the control section 40 may control the discharge lamp drive section 230 on the basis of the average value of the drive voltages Vla of the discharge lamp 90 detected by the voltage detecting section 61 in the plural second periods which are present before (temporally prior to) the time t15.

Similarly, the control section 40 controls the discharge lamp drive section 230 on the basis of the drive voltage Via of the discharge lamp 90 detected by the voltage detecting section 61 in the period when the third control process is previously performed, in the third control process. For example, in the third period from the time t16 to the time t17, the control section 40 may control the discharge lamp drive section 230 on the basis of the drive voltage Vla of the discharge lamp 90 detected by the voltage detecting section 61 in the third period from the time t13 to the time t14. In the example shown in FIG. 9C, since the voltage value of the drive voltage Vla in the third period is V3, the control section 40 controls the discharge lamp drive section 230 to output the drive current I in which V3×I3 is the third power W3. Further, for example, in the third period from the time t16 to the time t17, the control section 40 may control the discharge lamp drive section 230 on the basis of the average value of the drive voltages Vla of the discharge lamp 90 detected by the voltage detecting section 61 in the plural third periods which are present before (temporally prior to) the time t16.

According to the discharge lamp lighting device 1 in the present embodiment, since the first control process is performed on the basis of the drive voltage Vla of the discharge lamp 90 detected by the voltage detecting section 61 in the period when the first control process is previously performed, the second control process is performed on the basis of the drive voltage Vla of the discharge lamp 90 detected by the voltage detecting section 61 in the period when the second control process is previously performed, and the third control process is performed on the basis of the drive voltage Via of the discharge lamp 90 detected by the voltage detecting section 61 in the period when the third control process is previously performed, it is possible to control the electric power supplied to the discharge lamp 90 with high accuracy. Accordingly, it is possible to realize a discharge lamp lighting device capable of controlling the brightness of the discharge lamp with high accuracy.

In the discharge lamp lighting device 1 according to the present embodiment, by obtaining the drive voltage Vla of the discharge lamp 90 detected by the voltage detecting section 61 in each period when the first control process is performed, obtaining the drive voltage Via of the discharge lamp 90 detected by the voltage detecting section 61 in each period when the second control process is performed, and obtaining the drive voltage Vla of the discharge lamp 90 detected by the voltage detecting section 61 in each period when the third control process is performed, the drive voltage Via of the discharge lamp 90 is obtained whenever a target power value is changed, and thus, it is possible to control the brightness of the discharge lamp 90 according to the state of the discharge lamp 90 with high accuracy.

In the discharge lamp lighting device 1 according to the present embodiment, by obtaining the drive voltage Vla of the discharge lamp 90 in the second half of the period when the first control process is performed, in the second half of the period when the second control process is performed, and in the second half of the period when the third control process is performed, it is possible to obtain the drive voltage Vla of the discharge lamp 90 detected at the timing when the drive voltage Via of the discharge lamp 90 is stable. Accordingly, it is possible to control the brightness of the discharge lamp 90 with high accuracy.

In each embodiment as described above, the projector which uses three liquid crystal panels has been described as an example, but the invention is not limited thereto and may be applied to a projector which uses one, two, four or more liquid crystal panels.

In each embodiment as described above, a transmission type projector has been described, but the invention is not limited thereto and may be applied to a reflection type projector. Here, the "transmission type" means a type in which an electro-optic modulation device as an optical modulation unit transmits light, such as a transmission type liquid crystal panel, and the "reflection type" means a type in which an electro-optic modulation device as an optical modulation unit reflects light, such as a reflection type liquid crystal panel or a micromirror type optical modulation device. As the micromirror type optical modulation device, for example, DMD (digital micromirror device, trademark of Texas Instrument Inc.) may be used. In a case where the invention is applied to the reflection type projector, it is possible to achieve the same effect as in the transmission type projector.

The invention may be applied to the case of a front projection type projector which projects a projection image from the side of observation, and may be applied to the case of a rear projection type projector which projects the projection image from the side opposite to the side of observation.

In each embodiment as described above, in the period of ½ cycle of polarity inversion of the drive current I, the absolute value of the drive current I becomes constant. That is, the waveform of the drive current I is a so-called square waveform. The waveform of the drive current I is not limited thereto, and may be a waveform in which the absolute value of the drive current I uses different values in the period of one cycle of the polarity inversion of the drive current I such as a waveform which starts in a period when the absolute value of the drive current I becomes a first electric current value and ends in a period when the absolute value of the drive current I becomes a second electric current value larger than the first electric current value in the period of a half cycle of the polarity inversion of the drive current I, or a waveform in which the absolute value of the drive current I is monotonically increased in the period of the half cycle of the polarity inversion of the drive current I.

The invention is not limited to the above-described embodiments, and various modifications may be made in the range of the spirit of the invention.

The invention includes a configuration which is substantially the same as the configuration described in the embodiments (for example, a configuration in which functions, ways and results are the same, or a configuration in which objects and effects are the same). Further, the invention includes a configuration in which parts which are not essential in the configuration described in the embodiment are replaced. Further, the invention includes a configuration having the same operations and effects as in the configuration described in the embodiment, or a configuration capable of achieving the same object as in the configuration described in the embodiment. Further, the invention includes a configuration in which known techniques are added to the configuration described in the embodiment.

The entire disclosure of Japanese Patent Application No. 2011-217573, filed Sep. 30, 2011 is expressly incorporated by reference herein.

What is claimed is:
1. A discharge lamp lighting device comprising:
a discharge lamp drive section that supplies electric power to a discharge lamp;
a voltage detecting section that detects a drive voltage of the discharge lamp; and a control section that controls the discharge lamp drive section,
wherein the control section performs
a first control process of controlling the discharge lamp drive section in a current first period so that the electric power supplied to the discharge lamp is a first power, and
a second control process of controlling the discharge lamp drive section in a current second period so that the electric power supplied to the discharge lamp is a second power different from the first power,
wherein in the first control process, the control section controls the discharge lamp drive section based on the drive voltage of the discharge lamp detected by the voltage detecting section during a previous first period and not a previous second period when the first control process is previously performed, the previous first period being a first period before a second period preceding the current first period, and
wherein in the second control process, the control section controls the discharge lamp drive section based on the drive voltage of the discharge lamp detected by the voltage detecting section during a previous second period and not a previous first period when the second control process is previously performed, the previous second period being a second period before a first period preceding the current second period.

2. The discharge lamp lighting device according to claim 1, wherein the control section
obtains the drive voltage of the discharge lamp detected by the voltage detecting section in each period when the first control process is performed, and
obtains the drive voltage of the discharge lamp detected by the voltage detecting section in each period when the second control process is performed.

3. The discharge lamp lighting device according to claim 1, wherein the control section
obtains the drive voltage of the discharge lamp detected by the voltage detecting section in a second half of a period when the first control process is performed, and
obtains the drive voltage of the discharge lamp detected by the voltage detecting section in a second half of a period when the second control process is performed.

4. A projector comprising the discharge lamp lighting device according to claim 1.

5. A projector comprising the discharge lamp lighting device according to claim 2.

6. A projector comprising the discharge lamp lighting device according to claim 3.

7. The discharge lamp lighting device according to claim 1,
wherein in the first control process, the control section controls the discharge lamp drive section based on a first average drive voltage of the discharge lamp detected by the voltage detecting section during the plurality of first periods in which the first control process was previously performed, the first average drive voltage being an average of the drive voltages detected in the plurality of previous first periods, and
wherein in the second control process, the control section controls the discharge lamp drive section based on a second average drive voltage of the discharge lamp detected by the voltage detecting section during the plurality of second periods in which the second control process was previously performed, the second average drive voltage being an average of the drive voltages detected in the plurality of previous second periods.

* * * * *